United States Patent [19]

Solheim et al.

[11] 4,062,006
[45] Dec. 6, 1977

[54] COMBUSTION MONITORING SYSTEM

[76] Inventors: Fredrick S. Solheim, 555 Arapahoe;
Lee A. Erb, 3565 Catalpa Way, both of Boulder, Colo. 80302

[21] Appl. No.: 680,023

[22] Filed: Apr. 26, 1976

[51] Int. Cl.² ............................................. G08B 21/00
[52] U.S. Cl. ................................ 340/228 R; 340/410; 239/14; 431/13
[58] Field of Search ................... 340/228 R, 409, 410; 431/13, 14, 15; 239/14

[56] References Cited

U.S. PATENT DOCUMENTS

| | | | |
|---|---|---|---|
| 3,508,232 | 4/1970 | Williams | 340/228 R |
| 3,582,926 | 6/1971 | Hassan | 340/228 R |
| 3,688,295 | 8/1972 | Tsoras | 340/228 R |
| 3,821,562 | 6/1974 | Davis | 340/228 R |
| 3,883,753 | 5/1975 | Harrison | 340/228 R |

*Primary Examiner*—Thomas B. Habecker
*Attorney, Agent, or Firm*—O'Rourke & Harris

[57] ABSTRACT

A monitoring system is disclosed that is particularly well suited for use in connection with combustion in a cloud seeding generator. The monitoring system includes an indicator light the energization of which indicates a specific combustion state and normally indicates that combustion has occurred. Energization of the indicator light is controlled by a comparator which has one input connected with a thermocouple positioned in the combustion chamber to monitor the combustion state. The cloud seeding generator is preferably mounted in an aircraft and, when so mounted, the indicator light may be remotely located as, for example, on the aircraft instrument panel to indicate combustion and/or ignition as well as proper operation of the cloud seeding generator.

8 Claims, 1 Drawing Figure

U.S. Patent    Dec. 6, 1977    4,062,006
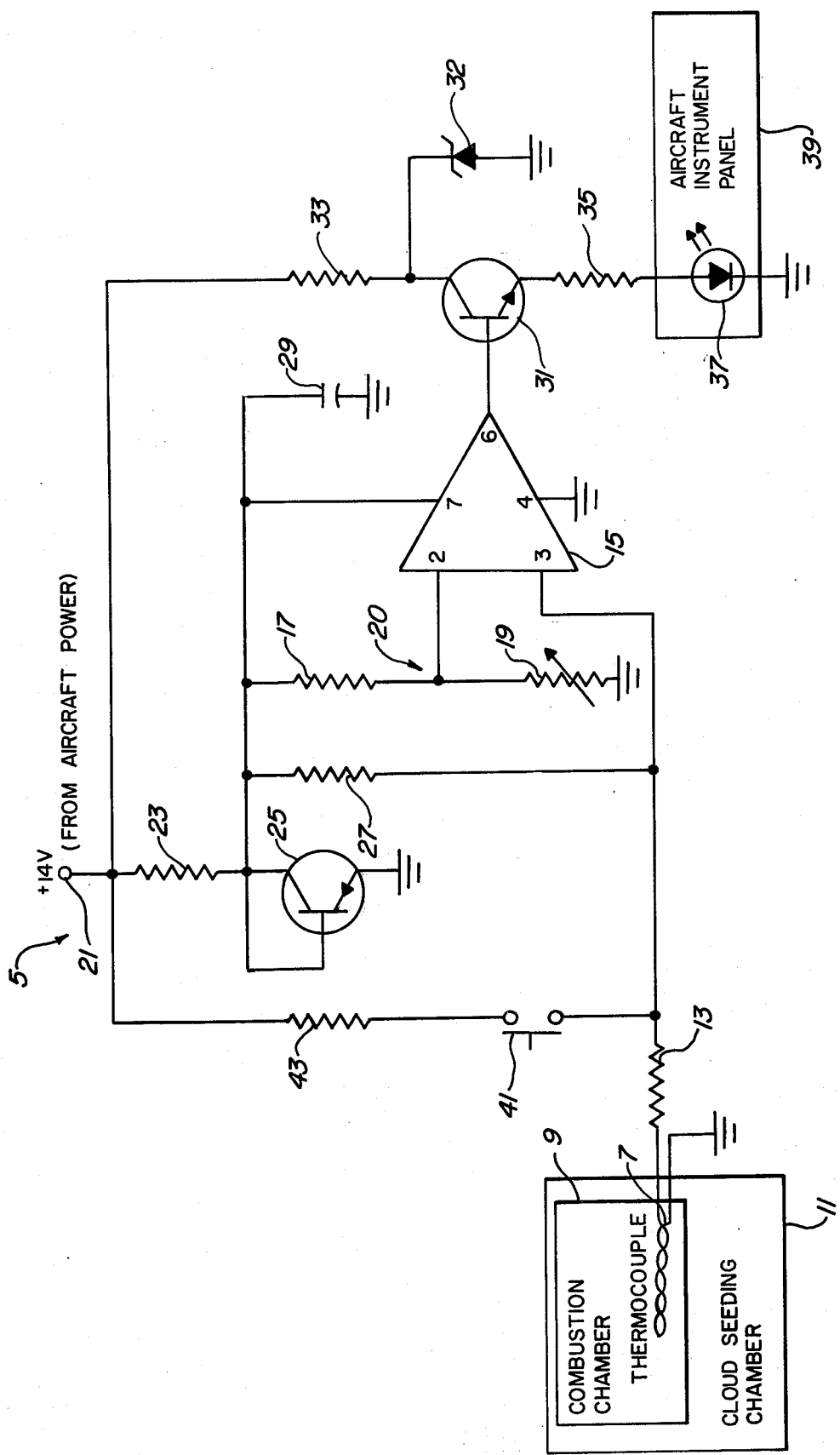

COMBUSTION MONITORING SYSTEM

FIELD OF THE INVENTION

This invention relates to a monitoring system and, more particularly, relates to a system for monitoring the combustion state of a cloud seeding generator.

BACKGROUND OF THE INVENTION

As technology has advanced, so has the need for assuring that specific products of that technology function properly. To this end, various types of monitoring devices have been suggested and/or utilized for assuring proper operation of many diverse units. Such monitoring devices are vital, for example, where proper operation of the unit cannot be readily determined due to inaccessibility of the unit or where the unit must operate properly for safety reasons.

Units that must be ignited, such as, for example, units having an electrical circuit to ignite fuel in vapor form, are particularly dependent upon proper ignition and the resulting combustion is often not easily detectable. Among such units are artificial ice nuclei, or cloud seeding, generators which are commonly positioned on aircraft wings or the like and the fuel therein ignited by an electrical circuit that includes a spark plug or other igniter. An example of such a generator is shown and described in U.S. Pat. No. 3,645,446.

As can be appreciated from the foregoing, a cloud seeding generator for use on an aircraft must be lightweight, have the ability to utilize low voltage (14 to 28 volts), and have low power consumption requirements. In addition, it is important that such a generator operate as intended, and hence a positive indication of operation or lack thereof is particularly important.

Combustion and/or proper operation of a cloud seeding generator has, however, not heretofore been successfully monitored, and a system for dependable achievement of such an end would enhance such generators.

SUMMARY OF THE INVENTION

This invention provides a monitoring system that is particularly well suited for use to sense combustion of a cloud seeding generator. Combustion is monitored to assure proper operation of the generator with an indication of operation being remotely provided as, for example, at the instrument panel of an aircraft having the cloud seeding generator mounted thereon.

It is therefore an object of this invention to provide an improved monitoring system.

It is another object of this invention to provide a monitoring system to sense combustion.

It is still another object of this invention to provide a monitoring system to sense combustion of a cloud seeding generator.

It is still another object of this invention to provide a monitoring system to assure proper operation of an ignition circuit to cause combustion.

It is yet another object of this invention to provide a monitoring system that includes an indicator light for indicating operation, a comparator, and a thermocouple for sensing combustion.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the hereindisclosed invention are meant to be included as come within the scope of the claims.

BRIEF DESCRIPTION OF THE DRAWINGS

The accompanying drawing illustrates a complete embodiment of the invention according to the best mode so far devised for the practical application of the principles thereof, and in which the single FIGURE is a combined block and electrical schematic diagram of the monitoring system of this invention.

DESCRIPTION OF THE INVENTION

Referring now to the drawings, the numeral 5 refers generally to the monitoring system of this invention. As shown, the system includes a thermocouple 7 that is positioned adjacent to or within the combustion chamber 9 of an artificial ice nuclei, or cloud seeding, generator 11 to sense combustion in the chamber.

Thermocouple 7 may be conventional, and as is well known, is a device for measuring temperature where two electrical conductors of dissimilar metals are joined at the point of heat application and a resulting voltage difference, directly proportional to temperature, is developed across the free ends and is measured potentiometrically.

Cloud seeding generator 11 may be conventional and the combustion chamber 9 therein may likewise be conventional. An artificial ice nuclei generator having an acetone burner with an ignition circuit to cause combustion is shown and described in U.S. Pat. No. 3,645,446, and may be referred to for a more complete description of such a generator and ignition circuit.

As shown in the drawing, thermocouple 7 may be grounded at one side with the other side being connected through resistor 13 to one input (pin 3) of comparator 15. Comparator 15 has a second input (pin 2) connected to the junction of resistor 17 and potentiometer 19 with resistor 17 and potentiometer 19 being connected in series to form a voltage divider 20 with potentiometer 19 being connected to ground at one side.

A source of power such as, for example, +14 volts as is commonly available in an aircraft, is coupled to power input junction 21. Resistor 23 has one side connected to junction 21 and the other side connected to the collector and base of transistor 25 which is connected to operate as a Zener breakdown (+5 to +14 volts) for the voltage supply. As shown, the emitter of transistor 25 is grounded, and the collector and base of transistor 25 are connected to one side of resistor 17, to one side of resistor 27, to pin 7 of comparator 15, and to one side of comparator 29. The other side of resistor 27 is connected to pin 3 of comparator 15 while the other side of comparator 29 is grounded as is pin 4 of comparator 15.

The output (pin 6) of comparator 15 is connected to the base of transistor 31. The collector of transistor 31 is connected with ground through Zener diode 32 and through resistor 33 to the +14 volt power supply junction 21, while the emitter is connected through resistor 35 to indicator, or light, 37, the other side of which is connected with ground. As indicated, light 37 can be a panel light and can be remotely located as, for example, on the instrument panel of an aircraft having the cloud seeding generator 11 mounted thereon.

A test switch 41 is also provided and is connected at one side to pin 3 of comparator 15 and at the other side to the +14 volt power junction 21 through resistor 43.

The following is a listing of values for the components of a working embodiment of this invention, but the invention is not meant, however, to be limited to the particular components and/or values shown:

Resistors (ohms): 13–47, 17–6.8K, 23–200, 27–6.8K, 33–150, 35–82, 43–10K.
Potentiometer: 19–0 to 100
Capacitor: 29 – 0.1 Fd
Transistors: 25–2N3638, 31–2N2222
Comparator: 15–CA 3130(IC)
Zener Diode: 32–15 volt 1w
Light: 37–mv5020

For operation, thermocouple 7 is positioned in the combustion chamber 9 of cloud seeding generator 11 and senses the temperature rise indicating combustion within the chamber of the generator. The output from thermocouple 7 is coupled to one input of comparator 15. Comparator 15 provides an output when the voltage coupled from the thermocouple exceeds a threshold established by the comparison voltage applied to the comparator at pin 2 from the voltage divider 20, which voltage can be varied by varying potentiometer 19 (between approximately 0 and 100 mv). Transistor 25 provides a regulated voltage at the collector and hence a constant voltage across the voltage divider.

When the voltage applied to the comparator at pin 3 exceeds the reference voltage at pin 2, an output is provided to transistor 31 to turn the transistor on. This energizes light 37 to provide an indication of proper operation and the combustion state of the cloud seeding generator.

If desired, the thermocouple could also be connected to sense a lack of combustion and cause energization of light 37 to indicate a failure of the cloud seeding generator, as would be obvious to one skilled in the art.

In order to test the monitoring circuit, test switch 41 is closed to provide sufficient voltage to pin 3 of comparator 15 to cause transistor 31 to be turned on to energize light 37. Opening of the switch will then turn off transistor 31 and light 37.

In addition, resistor 27 provides a self test for the monitoring system and indicates a failure of the thermocouple by applying sufficient voltage to cause an output from comparator 15 to turn on transistor 31 and energize light 37.

In view of the foregoing, it can be seen that the monitoring system of this invention provides a novel system for monitoring the combustion state of a cloud seeding generator.

What is claimed is:

1. A monitoring system for sensing the combustion state of a combustion chamber of a cloud seeding generator, said monitoring system comprising:
    sensing means positioned adjacent to said combustion chamber of said cloud seeding generator and producing an electrical output signal indicative of a predetermined state thereof;
    signal processing means for receiving said electrical output signal from said sensing means and providing an output when said signal from said sensing means exceeds a predetermined value;
    indicating means connected with said signal processing means to receive the output therefrom and responsive thereto providing an indication of the combustion state of said combustion chamber of said cloud seeding generator; and
    testing means connected with said signal processing means for verifying that said system is operable.

2. The monitoring system of claim 1 wherein said sensing means provides an output signal indicative of combustion within said chamber of said cloud seeding generator, and wherein said indicating means indicates that said combustion has occured.

3. The monitoring system of claim 1 wherein said sensing means provides an output signal indicative of non-combustion within said combustion chamber of said cloud seeding generator, and wherein said indicating means indicates that combustion has failed to occur.

4. The monitoring system of claim 1 wherein said signal processing means includes first and second voltage divider circuits with said first voltage divider circuit having said sensing means connected therein, and wherein said signal processing means also includes a comparator connected with said first and second voltage divider circuits so that said comparator receives a reference signal and said electrical output signal from said sensing means, said comparator providing an output when said electrical output signal coupled to said comparator exceeds said reference signal coupled thereto to thereby cause an indication at said indicating means of the combustion state of said combustion chamber of said cloud seeding generator.

5. The monitoring system of claim 1 wherein said indicating means is mounted for remote indication of a predetermined operational state of said cloud seeding generator.

6. A monitoring system for sensing combustion in the combustion chamber of a cloud seeding generator, said system comprising:
    a thermocouple adjacent to the combustion chamber of a cloud seeding generator, said thermocouple providing an electrical output signal the value of which is dependent upon the combustion state of said cloud seeding generator;
    a reference signal generating means providing a reference output signal;
    a comparator receiving said electrical output signal from said thermocouple and said reference output signal and providing an output signal when said electrical output signal exceeds said reference output signal; and
    an indicating light remotely situated with respect to said cloud seeding chamber and connected with said comparator, said indicating light being energized in response to an output from said comparator to indicate a predetermined combustion state of said cloud seeding generator.

7. The monitoring system of claim 6 wherein said system includes resistance means and a switch connected in series between a source of power and said comparator whereby closing of said switch energizes said indicating light to verify that said system is operable.

8. The monitoring system of claim 6 wherein said cloud seeding generator is aircraft mounted and wherein said indicating light is on the instrument panel of said aircraft.

* * * * *